W. C. FARNUM.
HANDLE TURNING MACHINE.
APPLICATION FILED JAN. 10, 1912.
1,075,245.
Patented Oct. 7, 1913.
6 SHEETS—SHEET 5.
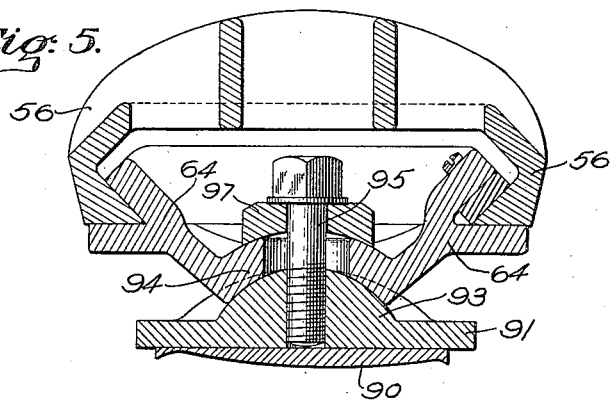
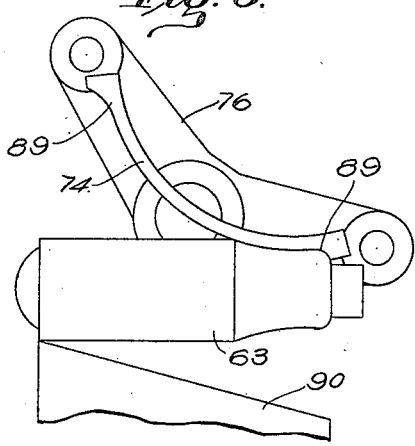
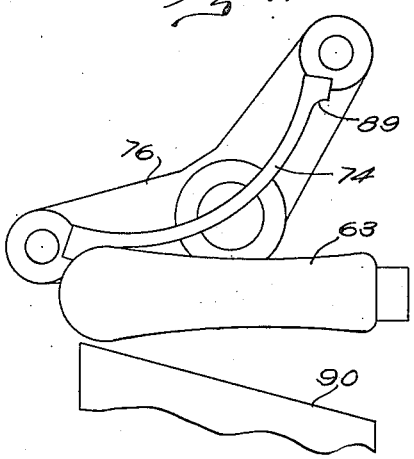
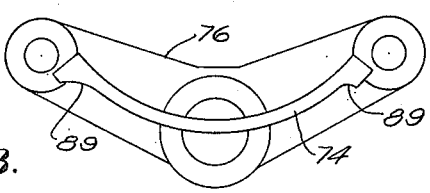
Witnesses:
Roswell F. Hatch
Amelia M. Ross
Inventor:
William C. Farnum
by Robt. R. Hains
Atty.

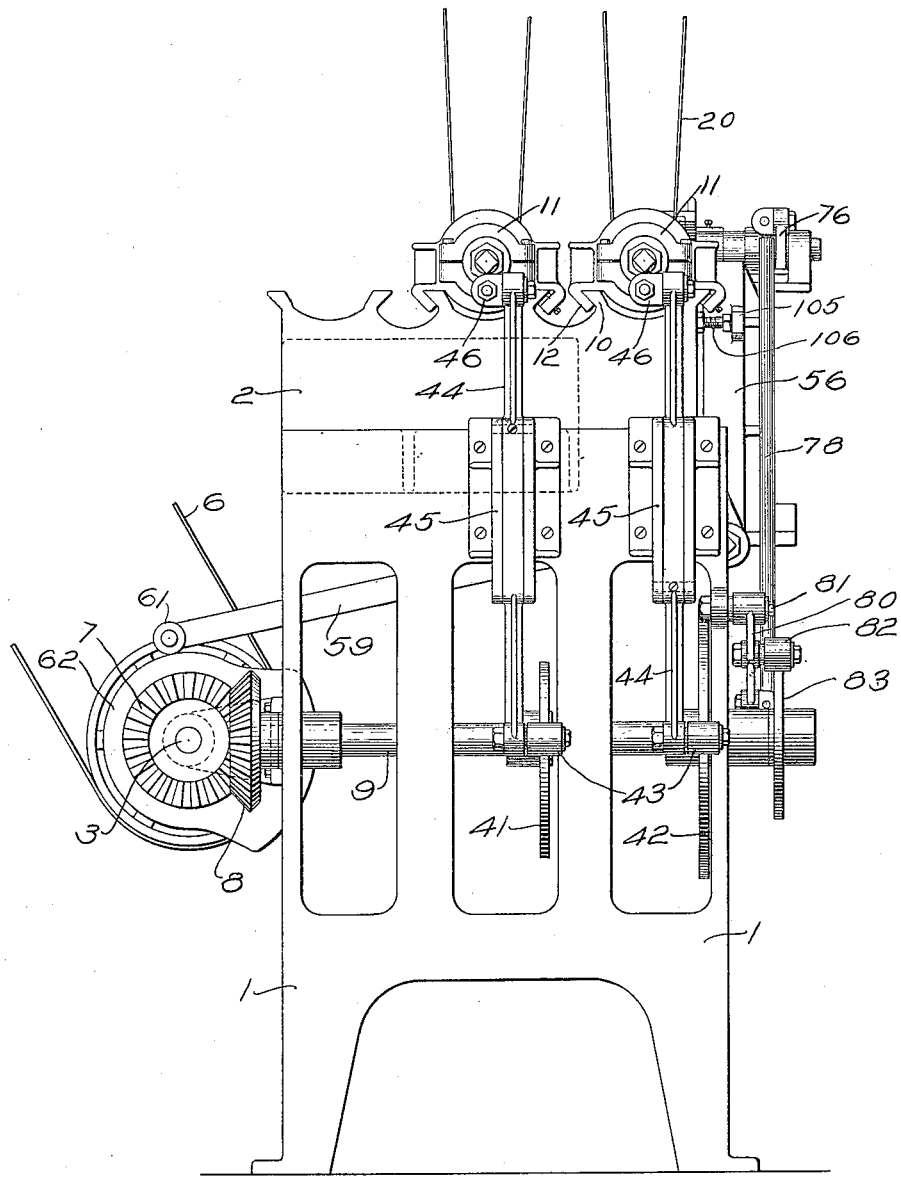

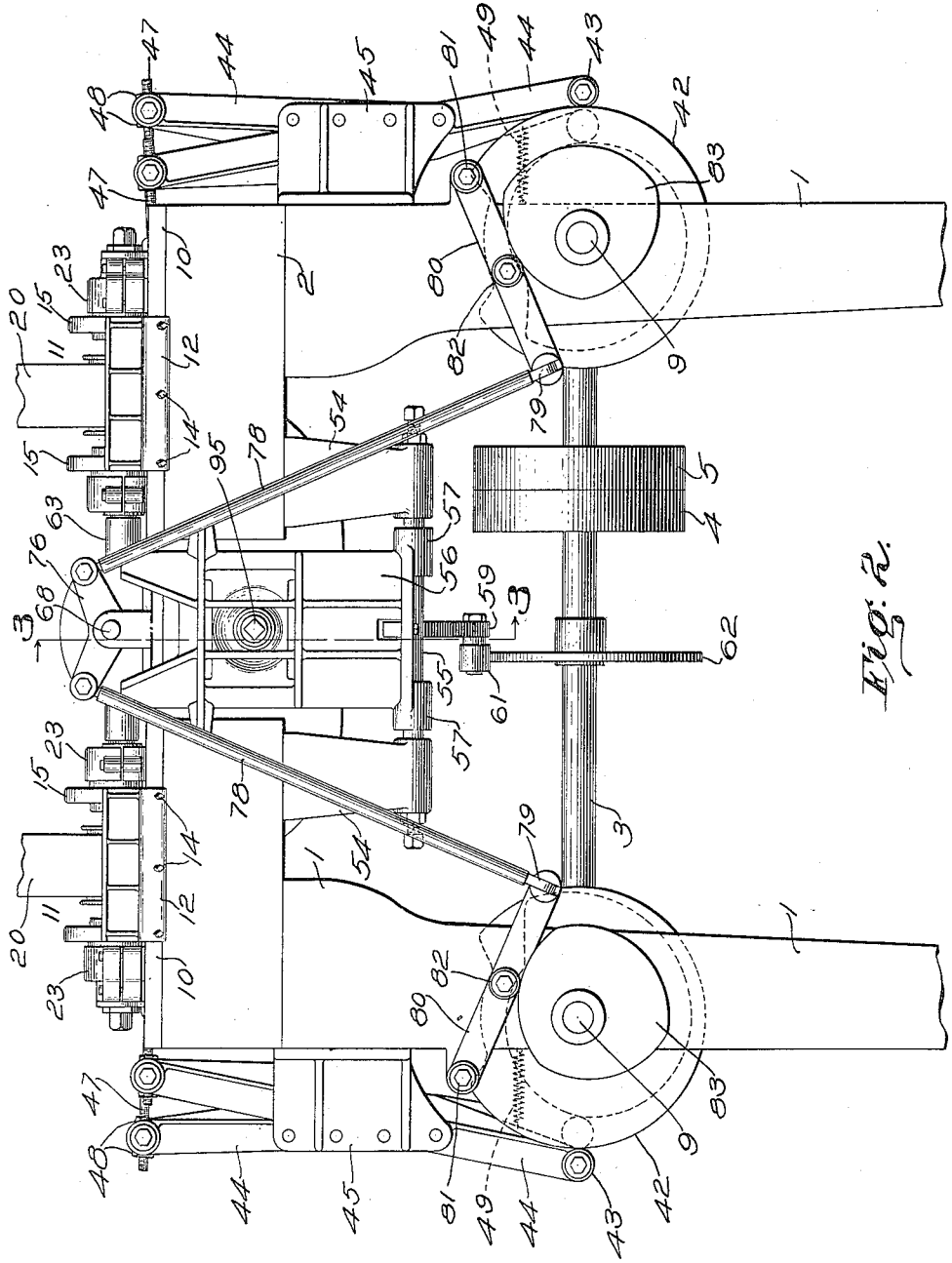

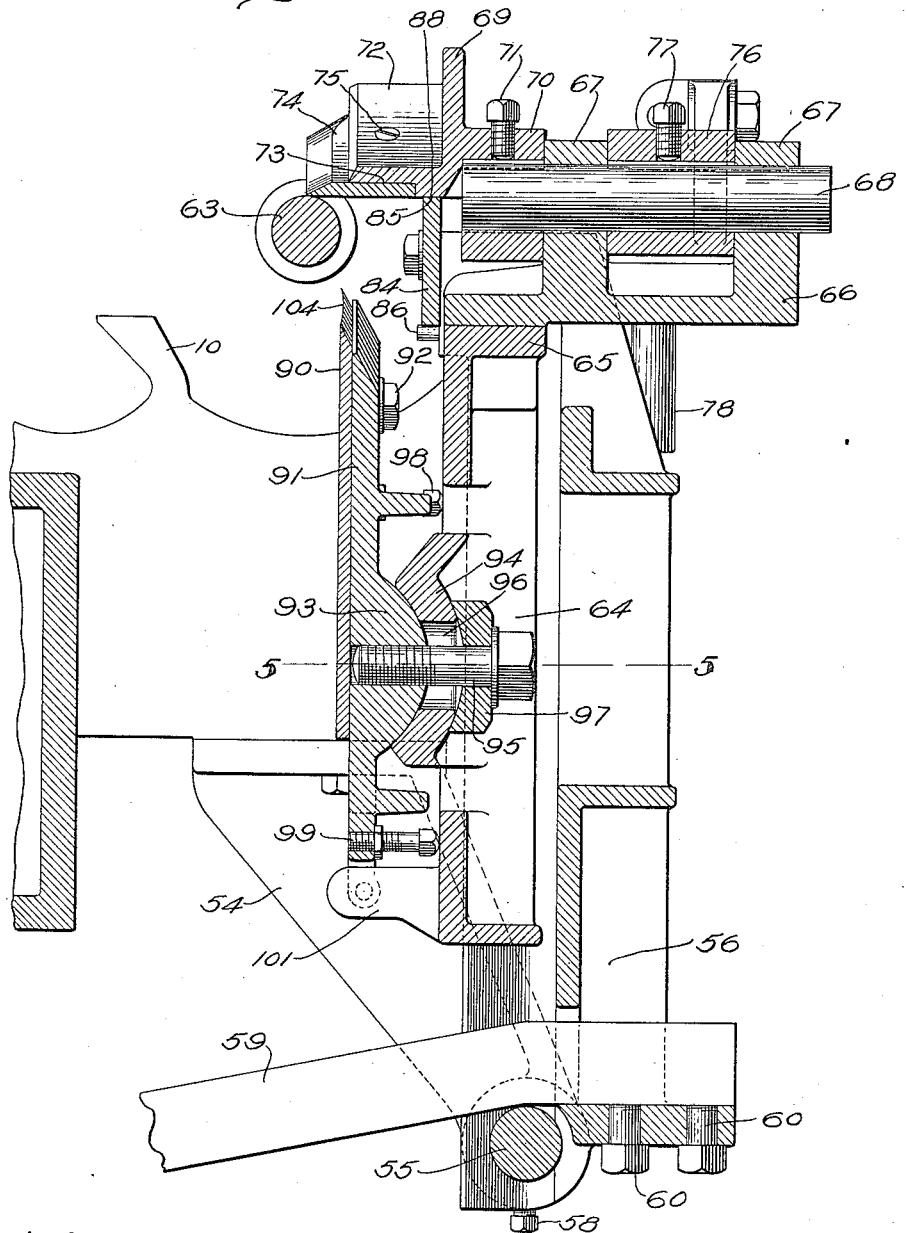

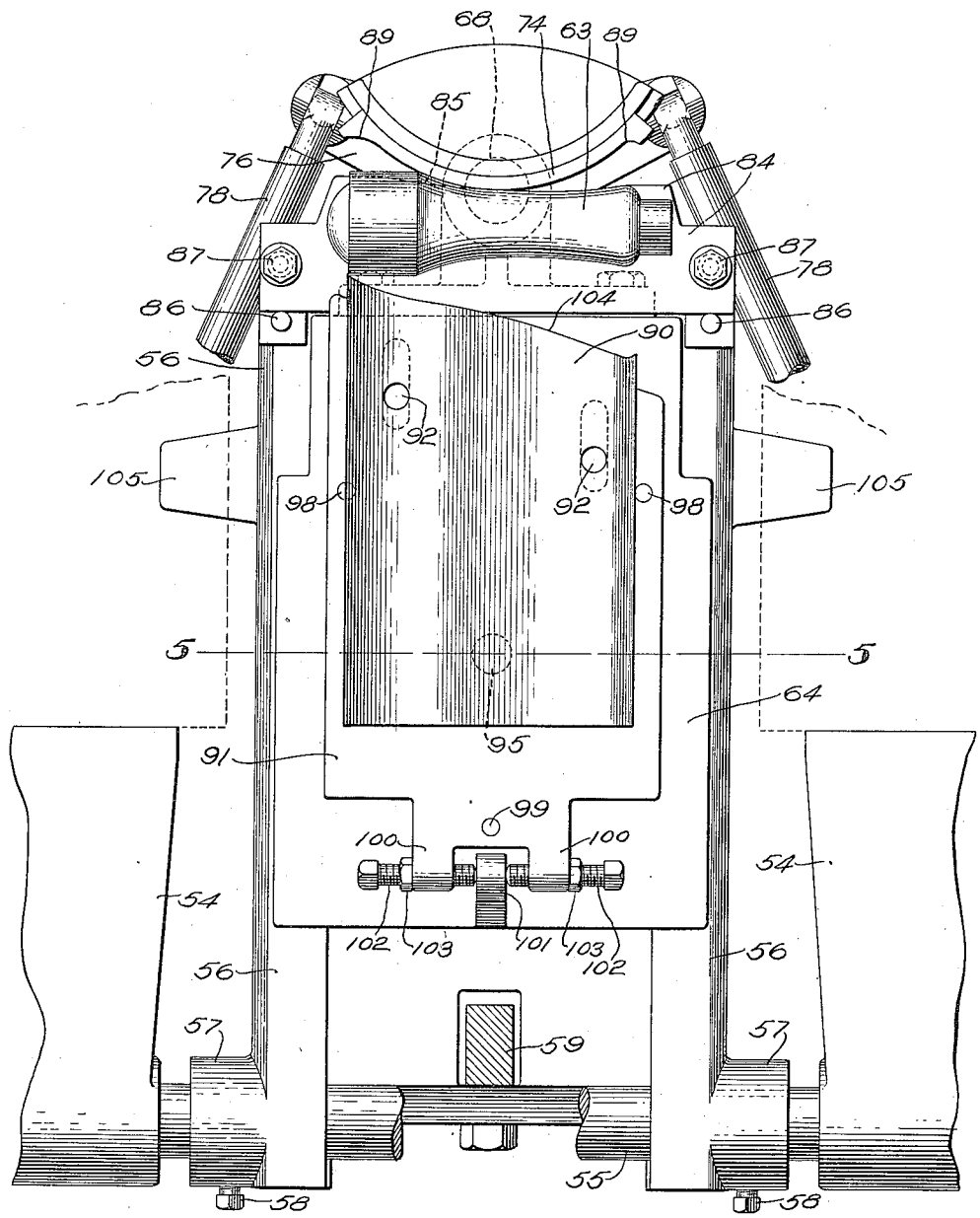

W. C. FARNUM.
HANDLE TURNING MACHINE.
APPLICATION FILED JAN. 10, 1912.
1,075,245.
Patented Oct. 7, 1913.
6 SHEETS—SHEET 6.
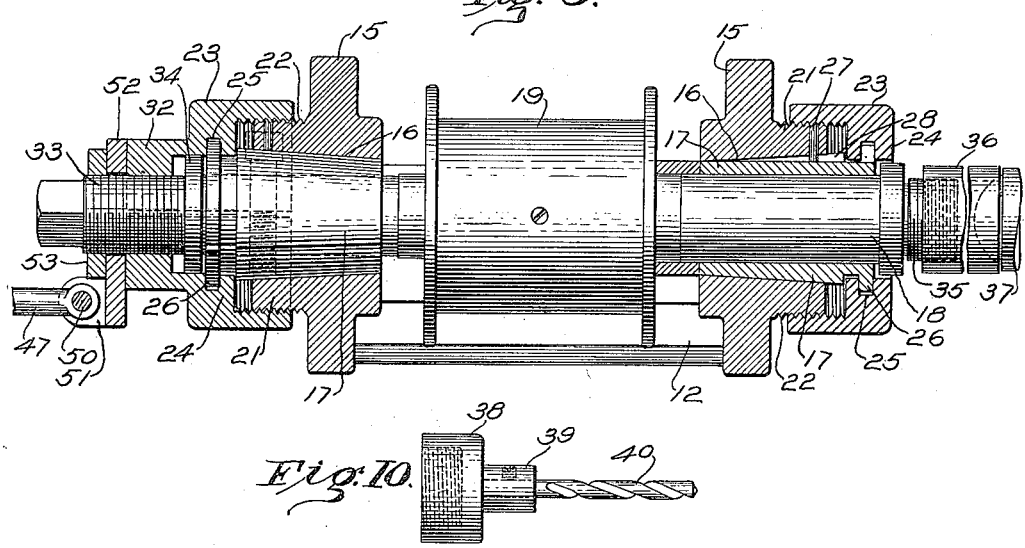
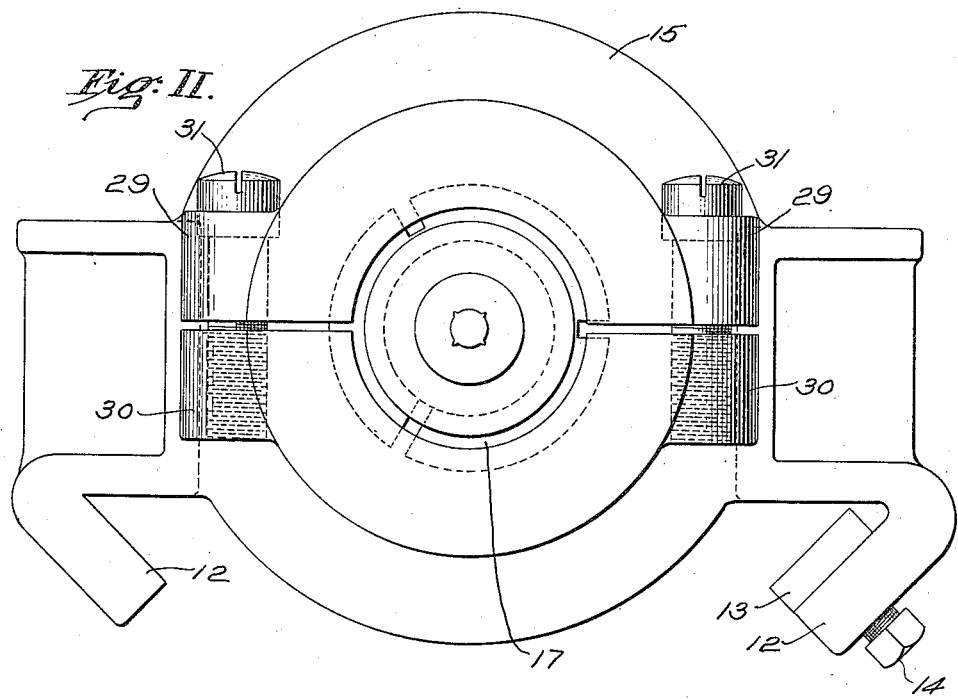
Witnesses:
Powell F. Hatch
Amelia M. Ross
Inventor:
William C. Farnum
by Robt. P. Harris
Atty.

UNITED STATES PATENT OFFICE.

WILLIAM C. FARNUM, OF FITCHBURG, MASSACHUSETTS, ASSIGNOR OF ONE-HALF TO HENRY E. COWDREY AND CHARLES F. COWDREY, BOTH OF FITCHBURG, MASSACHUSETTS.

HANDLE-TURNING MACHINE.

1,075,245.     Specification of Letters Patent.      Patented Oct. 7, 1913.

Application filed January 10, 1912. Serial No. 670,393.

*To all whom it may concern:*

Be it known that I, WILLIAM C. FARNUM, a citizen of the United States, residing at Fitchburg, in the county of Worcester and State of Massachusetts, have invented an Improvement in Handle-Turning Machines, of which the following description, in connection with the accompanying drawings, is a specification, like letters on the drawings representing like parts.

The invention to be hereinafter described relates to wood boring and turning machines wherein wooden blanks may be bored and the exterior surface turned and finished in the formation of the completed product, such as handles.

The aims and purposes of the present invention are to provide a machine of the above general type which shall be simple in construction and effective and economical in operation, and wherein the parts and their association shall be such that wooden blanks may be effectively bored and turned into the desired shape of the finished article. These and other objects of the present invention will best be made clear from the following description and accompanying drawings of one form of means for carrying the invention into practical effect, it being understood that in details the various parts and their relation may be modified within the true scope of the invention, which is definitely pointed out and defined by the claims.

In the drawings: Figure 1 is a side view of a boring and turning machine for making handles, such, for instance, as are used with hand manipulated tools, and involving features of the present invention; Fig. 2 is a view of the machine illustrated by Fig. 1, looking in the direction at right angles to said Fig. 1; Fig. 3 is an enlarged sectional view on the line 3—3 of Fig. 2, showing more particularly the roughing and finishing knives and their associated parts; Fig. 4 is a view of the parts shown by Fig. 3 looking from the left of Fig. 3; Fig. 5 is a section on the line 5—5 of Figs. 3 and 4; Figs. 6, 7 and 8 are diagrammatic views showing various positions of the roughing or turning knife as it rocks longitudinally of the blank, and the final position of said knife as the finishing knife is completing the handle; Fig. 9 is an enlarged detail, part in side elevation and part in section, showing one of the head stocks for holding and rotating the blank; Fig. 10 is a detail showing one convenient form of boring tool; and Fig. 11 is an enlarged end view of one of the head stocks.

The machine frame may be of any suitable character for the support of the working parts and is conveniently shown as comprising supporting end frames 1, 1, sustaining the machine bed 2.

Journaled in the end frames 1, 1 is the main driving shaft 3, Figs. 1 and 2, carrying the usual fast and loose pulleys 4, 5 which may be driven from a suitable source of power by a belt 6, Fig. 1. Mounted on each end of the shaft 3 is a bevel gear 7 which is operatively engaged by bevel gears 8 on the side cam shafts 9, whereby motion is imparted from the single driving shaft to each of the cam shafts, as will be readily understood from Figs. 1 and 2.

The present invention contemplates the simultaneous boring and turning of different blanks, that is to say, while one blank is being bored, another is being turned and finished, and to this end the appropriate boring heads and turning heads are preferably arranged in pairs alongside of each other, so that when a blank has been bored it may be conveniently transferred to the turning heads and the exterior turned and finished. In the illustrated form of the invention, one pair of boring heads and one pair of turning heads are shown arranged side by side for the purpose stated, but obviously a greater number of pairs of boring and turning heads may be employed in the relation stated within the true scope of the actual invention.

Since the general construction of the boring and turning heads and their mounting upon the machine frame are or may be the same except that in case of the former a boring tool is connected to the head, while in the latter a head stock center is employed to engage the ends of the blank and turn it, a description of one of the turning heads and its mounting will be sufficient to make clear to one skilled in the art the construction appropriate to all.

The machine bed 2 at opposite side portions thereof is provided with suitable ways 10, Figs. 1 and 2, on which slides the boring and turning head stocks 11. These ways 10 are preferably formed by upwardly projecting inclined portions, as shown, which are engaged by downwardly converging side portions 12, Figs. 1, 2 and 11, of the head stock frame, one of said side portions 12 being preferably provided with an adjustable shoe or wear plate 13, Fig. 11, held in position by appropriate screw bolts 14. The head stock 11 comprises suitable bearing portions 15 connected by the side portions 12, Fig. 9, and having conical bearing seats in which are mounted the conical split bushings 17 through which passes the shaft 18 of the turning head, which may be appropriately driven by a belt pulley 19 secured to said shaft and actuated by belt connection 20, Fig. 1, from a suitable source of power.

Each of the bearing portions 15 of the head stock has a hub-like portion 21 extending in opposite directions, Fig. 9, and provided with exterior screw threads 22 which are engaged by internal screw threads on a cap 23 having an inwardly projecting flange provided with a circular recess 25 engaged by a flange 26 projecting from the conical split bushing 17, the construction being such that by manipulation of the cap 23 by turning movement, the bushing 17 may be appropriately moved endwise in its conical bearing to take up any looseness that may exist between the shaft 18 and the bushing due to wear. In order that the bushing may not turn as the cap 23 is operated, a pin 27 is passed through the hub of the bearing part 15 and enters a longitudinal recess 28 on the exterior of the conical bushing, Fig. 9. When the parts have been adjusted into desired position the cap 23 should be properly locked or prevented from turning movement, and as a convenient form of means to this end the cap 23 may be formed of two or more parts joined by suitable clamping means. This construction, as shown by Fig. 11, contemplates that the parts of the cap 23 shall be provided with suitable lugs 29 and 30, which may be drawn together by clamping bolts 31 or other desirable device.

From the construction thus far described, it will be noted that any wear or lost motion between the shaft or spindle 28 and its bushing 17 may be readily taken up by simply loosening the clamp screws 31, turning the cap 23, and then, when the parts are suitably related, again setting up the clamps 31.

In the respects noted, each end portion of the head stock, whether it be the boring or turning head, may be substantially as described. At the outer or left end of the head stock, however, it is convenient to provide means for taking up the end thrust of the shaft or spindle 18, and as one convenient form of means to this end the invention provides the cap 23 at the outer end of the head stock with a hub portion 32, Fig. 9, which is preferably provided with an internal screw thread for the reception of an adjustable thrust member 33, the end of which may be conveniently seated against a disk 34, or other bearing part, against which the end of the shaft or spindle 18 rests.

The construction of the boring and turning head stocks as thus far described may be similar. In the case of the boring head, however, it is necessary that means be provided for the attachment of a boring tool, while with the turning head, that like provision be made for the centers which hold the blank and turn it. These conditions are met in the present invention by providing the inner end of the shaft or spindle 18 with means which permit the attachment of either, and in the illustrated embodiment of this feature of the invention the inner end of the shaft or spindle 18 is screw threaded at 35, Fig. 9, to receive either the internally screw threaded socket piece 36 having an appropriate turning center for the handle 37 to be turned, or the similar socket piece 38, Fig. 10, having a tool carrying portion 39 for the boring tool 40.

While the construction of the boring and turning heads may be as described, they are given somewhat different longitudinal movements, because the turning heads are intended to move inward and by their centers to engage the ends of the blank and turn it in order that the roughing and finishing knives may treat the exterior of the blank; whereas, the boring heads, one or both, are intended to carry a boring tool and advance it gradually as the tool bores through the blank which is held stationary by suitable means. It is convenient at this time to describe the means for imparting to the boring and turning heads their characteristic longitudinal movements, and as such means is substantially of the same general construction for all four of the set of head stocks, except as to the form of the cams, a description of one will be sufficient to enable those skilled in the art to understand and practice the invention.

Mounted on each of the side cam shafts 9, 9 are the cams 41 and 42, one of which is designed to give proper movement to a boring head and the other to a turning head. These cams act respectively upon rolls 43 carried by arms 44 pivotally mounted in suitable brackets 45 secured to the machine frame. At their upper ends the arms 44 carry swivel blocks 46, Fig. 1, each of which is connected to its appropriate head stock by a rod 47, Figs. 2 and 9. The rod 47 is preferably screw threaded and connected to the swivel block on the arm 44 by a nut 48, Fig. 2, on each side of the block; the construction being such that the length of the rod, and, perforce, the path of longitudinal movement of the connected head stock may be changed to suit conditions of use. Suitable springs 49 may be connected to the arms 44, to hold the rolls 43 in contact with the peripheries of the cams, or other suitable devices may be employed to insure the return movement of the head stock after it has been moved inward by the arm 44. The rod 47 may be connected to the appropriate head stock, Fig. 9, by a pin 50 passing through the end of said rod and lug 51 on a washer 52 held to the head stock by a nut 53, said nut thereby acting also as a lock nut for the screw threaded member 33.

From the construction thus far described, it will be apparent that upon actuation of the driving shaft, suitable motion will be imparted to the side cam shafts 9 to actuate the boring and turning head stocks, to cause the former to bore a longitudinal hole into the blank, and the latter to grasp the end of the blank and turn it for treatment by the turning or roughing knife and the finishing knife, the characteristic action of the boring and turning head stocks being defined by the character of the cams 41 and 42 respectively. It is convenient at this time to describe the turning or roughing knife.

Suitably mounted in brackets 54 depending from the machine bed, Figs. 2, 3 and 4, is a rock shaft 55 which sustains a swinging frame to which both the turning or roughing knife and the finishing knife are connected to partake of the swinging movement of said frame. This swinging frame which, as a whole, may be generally designated as 56, Figs. 2, 3 and 4, is provided with the hub portions 57 which are mounted on the rock shaft 55 and secured thereto by appropriate set screws 58. Secured to the swinging frame at its lower portion, Fig. 3, is an operating arm 59, one end of which is secured to the swinging frame 56 by suitable bolt connections 60, and the other end of which carries a roller 61, Fig. 1, which bears upon the periphery of a cam 62 mounted on the main driving shaft, see Figs. 1 and 2, the construction being such that under the actuation of the cam 62 and the arm 59, the swinging frame 56 may be swung from the position shown in Fig. 3 backwardly away from the blank 63 for purposes that will more fully hereinafter appear.

Mounted to slide vertically in the swinging frame 56 is the slide frame 64, Figs. 3 and 4, said slide frame being surmounted by a cross-piece 65, Fig. 3, on which is secured the knife carrier head 66 having rising from the base thereof the bearing portions 67, Fig. 3. Journaled for rotative movements in these bearing portions of the knife carrier head is a short knife carrier shaft 68 having mounted on one end thereof, at the left, Fig. 3, a knife carrier 69. As a convenient connection between the knife carrier shaft 68 and the knife carrier 69, the latter is provided with a hub portion 70 which is splined to the shaft 68 and secured to rotate therewith by means of a clamp screw 71, all as clearly shown in Fig. 3. The knife carrier 69 has a curved flange portion 72 projecting from the knife carrier, as indicated in Fig. 3, and having an undercut portion 73 in which is seated the curved roughing knife 74 appropriately secured to the knife carrier. As one means of detachably securing the curved roughing knife 74 to the carrier, suitable screw connections 75 are preferably employed. It will be noted from Figs. 3 and 4 that the roughing knife 74 has its lower central portion, which is intermediate its ends, in alinement with the axis of the shaft 68. Secured to the knife carrier shaft 68 between the bearing portions 67 is a yoke 76, Figs. 2, 3 and 4, which is splined to said shaft and otherwise secured thereto for rocking movement therewith by means of a set screw 77, Fig. 3. Jointed to the end portion of the yoke 76 are the operating arms 78, Figs. 2, 3 and 4, whereby appropriate rocking movement is imparted to the knife carrier shaft and, perforce, to the knife carrier and the roughing knife supported thereby. As one appropriate means to secure the desired rocking movement of the roughing knife, the operating arms 78 are jointed at their lower end portions 79 to the ends of levers 80, each of which is pivotally connected to the machine frame at 81, and has intermediate its ends suitable rolls 82 for engagement with operating cams 83 secured respectively to the side cam shafts 9. In order to provide for free universal movement of the arms 78 with respect to the levers 80 and the yoke 76, the ends of the arms 78 are connected to their respective levers 80 and yoke 76 by appropriate universal joint connection which, being of usual construction, need not be specifically described.

The present invention contemplates the use of an appropriate form or pattern in connection with the roughing or turning knife, said pattern 84 being of general plate character, as indicated in Figs. 3 and 4, and having its upper edge 85 of an appropriate contour. The form or pattern 84 is positioned upon the swinging frame 56 by means of pins 86, Figs. 3 and 4, upon which it rests, and having been placed in position upon said pins, it is secured by suitable bolts 87.

It will be noted from Fig. 3 that the knife carrier has a portion 88 curved substantially to conform with the curvature of the roughing or turning knife 74 and that this curved portion of the knife carrier rests upon the top surface 85 of the form or pattern 84, the construction being such that upon rocking movement being imparted to the knife carrier through its operating cams 83 and connecting devices, the part 88 of the knife carrier will be supported by and rocked on the upper edge of the form 84, the contour of said edge and curvature of the knife being such that upon rotation of the blank in the manner hereinbefore described, it will be subjected to a roughing or cutting action to bring it to the desired exterior form.

In the form of the invention illustrated, the roughing or turning knife is shown as formed on the arc of a circle, said arc passing through the axis of the knife carrier shaft, and the end portions 89, Figs. 6, 7 and 8, are shown as reversely curved to impart to the particular form of handle being turned the desired surface contour at the ends of the handle. In order that the roughing or turning knife may perform the desired work upon the blank, the knife carrier is rocked by the means described transversely upon the upper edge portion of the form or pattern and is caused bodily to rise and fall in accordance with the desired contour to be imparted to the handle by the shape of the form or pattern as the knife carrier is moved in the manner stated. It will be noted that the actuating levers 80 for giving the characteristic rocking movement to the knife rest upon the peripheral portions of their actuating cams 83, said cams being so formed as to insure that the weight of the knife carrier and its connected parts shall be sustained upon the upper edge portion of the pattern or form 84.

When the blank 63, Fig. 3, has been appropriately treated by the roughing or turning knife, it is desirable that the finishing knife be brought into action and that the roughing or turning knife be moved out of operative relation with the blank. In the present form of the invention, this characteristic movement is given to the slide 64 through the arms 78 and their actuating cams 83, so that when the roughing or turning knife has been rocked in the manner stated and its roughing action upon the blank has been completed, the cams 83 act simultaneously through the arms 78 to raise not only the knife carrier and its connected parts but likewise the entire slide 64, and to thereby raise the roughing or turning knife out of action and bring into operative relation with the blank the finishing knife, which will now be described.

The finishing knife 90, Figs. 3 and 4, is secured adjustably to the finishing knife holder 91 by means of suitable bolts 92 or other securing means, these parts being preferably so formed and related as to permit proper adjustment of the knife 90 with respect to the knife carrier 91, as indicated in Fig. 4.

The finishing knife carrier 91 has a spherical portion 93 which is received by a similarly shaped socket portion 94 carried by the slide 64, and a screw bolt 95 or other clamping means is preferably employed to secure the finishing knife carrier 91 to the slide 64. As one means to this end, the bolt 95 is preferably screw threaded into the spherical portion 93 of the finishing knife holder and passes through the enlarged slot 96 of the socket portion 94 of the slide, a washer 97 being interposed between the head of the bolt and the exterior of the portion 94 of the slide, the construction being such that upon loosening the bolt 95, the finishing knife holder 91 may be appropriately adjusted to position the finishing knife in desired relation to the blank.

Disposed above the bolt 95 and at each side of the median line of the knife and holder are the set screws 98, Figs. 3 and 4, and, similarly, in the median line of the said knife and holder and below the screw bolt 95 is the central set screw 99. Obviously, by a proper manipulation of the set screws or adjusting screws 98 and 99, after the bolt has been appropriately loosened, the finishing knife holder 91 and the finishing knife may be appropriately adjusted with respect to the vertical plane. To further adjust these parts in the vertical plane determined by the adjusting set screws 98 and 99, the lower end portion of the knife holder 91 is provided with lugs 100 which embrace between them a projection 101 extending from the slide frame 64, Figs. 3 and 4, and tapped into the projections 100 are the adjusting screws 102 which, if desired, may be provided with appropriate lock nuts 103.

From the construction described with respect to the finishing knife, it will be apparent that upon proper manipulation of the bolt 95 to loosen the finishing knife holder, said knife holder may be adjusted with respect to the vertical plane by means of the adjusting screws 98 and 99 and may be further adjusted in the vertical plane about the screw bolt 95 as a center by means of the adjusting screws 102.

In order that the finishing knife may impart a shear cut in its finishing action upon the blank, the upper edge 104 of the finishing knife, Figs. 3 and 4, is made inclined, its horizontal contour still conforming to the final contour of the handle or blank, the construction being such that upon appropriate raising movement of the slide 64 through the arms 78 as described, the upper left hand portion of the finishing knife will first be brought into action to perform its finishing cut upon the blank, whereupon successive portions of the finishing knife will be brought into action until the handle is finally given its completed finishing cut. When the swinging frame is moved to place the knives in operative position, it is desirable that their position be accurately fixed but adjustable, and to this end the swinging frame 56 is provided with side projecting lugs 105, Figs. 1 and 4, which are adapted to engage the adjustable stops 106, Fig. 1, on the machine frame.

From the construction and mounting of the finishing knife holder with respect to the sliding frame 64, it will be apparent that when once such holder and its knife have been properly adjusted on the sliding frame and the adjustable devices 98 and 99 once set, said finishing knife holder may be removed from the slide by merely disengaging the bolt 95 therefrom and when the holder is again secured to the slide, the devices 98 and 99, having remained undisturbed, will at once determine its proper position on the slide without further adjustment.

In the described embodiment of the invention with respect to the roughing knife, it will be noted that said knife is curved in an arc, the center of which is outside of a plane passing through the cutting edge of the knife and longitudinally thereof toward the base or securing portion thereof, and that said arc passes through the axis about which the knife carrier, and consequently the knife, rocks in performing its cutting action toward each end of the blank. It will also be noted that as the roughing knife is rocked transversely of the machine or longitudinally of the blank, it has a bodily movement toward and from the blank. This bodily movement toward and from the blank is preferably given the roughing knife through the form or pattern, the combined relation of pattern or form and the curve of the knife determining the contour of the blank as the knife is rocked longitudinally of the form. While the details of structure herein described are found to be a good practical form of the invention, it is to be understood that the invention in its true scope is not confined to such details but is defined by the claims.

Assuming that a blank is in position between the turning heads and is being turned or rotated thereby, and that the roughing knife has been placed in operative relation thereto, as indicated in Fig. 3, the roughing knife carrier and perforce the roughing knife are rocked transversely of the machine, or in other words longitudinally of the blank. As it is thus rocked, the roughing knife reduces the exterior of the blank, and it, as well as the weight of the entire sliding frame, are supported by the pattern or form which thus defines the rising and falling movement of the slide. If the handle is to have rounded or other curved end portions, the end portions of the knife are appropriately shaped to insure the desired character of handle end at the conclusion of the rocking excursion of the roughing knife.

The roughing action having been completed, the sliding frame is raised by appropriate means to remove the roughing knife and bring into action the finishing knife, which has been previously adjusted upon the slide. The means for thus raising the sliding frame comprises the same means as is employed in the illustrated form of the invention to rock the knife, but this may not be essential. The finishing knife having performed its operation, it is desirable that both it and the roughing knife be moved directly away from the now finished blank to permit another to be put in its place, the head stocks being relatively separated for this purpose, as already described. This movement of the knives is effected through the swinging frame which is turned upon its axis of swing by the cam described, thus removing both the knives from operative position. When a new blank has been put in place and engaged by the turning heads, the sliding frame is lowered and the swinging frame is simultaneously swung to bring the roughing knife again into operative position, whereupon the operation may be repeated.

What is claimed is:

1. In a machine of the character described, the combination of a machine bed having guideways, head stocks mounted for longitudinal movement toward and from each other on said ways, a swinging frame between the head stocks, a slide mounted on said swinging frame, a roughing knife mounted to rock transversely of said slide, a finishing knife mounted to move with the slide, means for rocking the roughing knife transversely and for raising the slide, and means for swinging the frame.

2. In a machine of the character described, the combination of means for supporting and rotating a blank, a form or pattern, a knife carrier stationary with respect to movement longitudinally of the blank and resting on said form or pattern, a curved roughing knife mounted on the said carrier, and means for rocking the curved roughing knife toward either end of the blank and in the plane of its curvature to present different portions of its cutting edge to different longitudinal portions of the blank during the roughing operation.

3. In a machine of the character described, the combination of means for supporting a blank in fixed position and rotating the same, a knife carrier, a roughing knife having a transversely curved cutting edge and mounted on said carrier, a pattern, and means for rocking the knife carrier upon said pattern during the cutting action of the knife to vary the position of the cutting edge.

4. In a machine of the character described, the combination of head stocks for supporting a blank between them, means for rotating a blank held between the head stocks, a knife carrier, a roughing knife having a transversely curved cutting edge and mounted on the carrier, means for rocking the knife transversely during its cutting action to bring different cutting edge portions of the knife into cutting relation with different longitudinal portions of the blank, and means for moving the knife bodily in the plane of its rocking movement as it is rocked.

5. In a machine of the character described, the combination of head stocks for supporting a blank between them, means for rotating a blank held between the head stocks, a knife carrier having sliding movement in a direction transversely of the blank, a roughing knife having a transversely curved cutting edge and mounted on the carrier, means for rocking the knife transversely during its cutting action to bring different cutting edge portions of the curved knife into cutting relation with different longitudinal portions of the blank, and a pattern for controlling bodily movement of the knife toward and from the axis of the blank as it is rocked.

6. In a machine of the character described, the combination of a supporting frame, head stocks for supporting a blank between them, means for rotating the blank held by the head stocks, a roughing knife having a cutting edge a part of which is curved transversely in the arc of a circle, means for rocking the knife transversely and pattern means for determining the position of the cutting edge of the knife as it is rocked.

7. In a machine of the character described, the combination of a supporting frame, head stocks for supporting a blank between them, means for rotating the blank held by the head stocks, a roughing knife having a cutting edge part of which is curved transversely in the arc of a circle, means for rocking the knife transversely along a plane passed through the cutting edge longitudinally of the knife, and means dependent upon the rocking movement of the roughing knife for varying the distance of the knife from the axis of the blank as it is rocked.

8. In a machine of the character described, the combination of a supporting frame, head stocks for supporting a blank between them, means for rotating the blank held by the head stocks, a knife carrier, a transversely curved roughing knife mounted on the carrier, and means for rocking the carrier about an axis passing through a cutting point of the knife.

9. In a machine of the character described, the combination of a supporting frame, head stocks for supporting a blank between them, means for rotating the blank held by the head stocks, a knife carrier, a transversely curved roughing knife mounted on the carrier, means for rocking the carrier about an axis passing through a cutting point of the knife, said means acting also to move the knife from the blank at the end of the roughing operation and means for causing bodily movement of the knife carrier and knife in a direction transverse to the axis of rocking movement during the cutting action of the knife.

10. In a machine of the character described, the combination of a frame, head stocks for supporting a blank between them, means for rotating the blank, a knife carrier, means for rocking the knife carrier about an axis transversely of and passing through a part of the blank, a transversely curved roughing knife mounted on the carrier and having its cutting edge extending through the axis of rocking movement, a slide on which the knife carrier is mounted and means for causing bodily movement of the slide knife carrier and knife in a direction toward and from the blank as the knife carrier and knife are rocked.

11. In a machine of the character described, the combination of a frame, head stocks for supporting a blank between them, means for rotating the blank, a knife carrier, means for rocking the knife carrier about an axis transversely of and passing through a part of the blank, a transversely curved roughing knife mounted on the carrier and having its cutting edge extending through the axis of rocking movement, and a pattern or form for controlling bodily movement of the carrier and knife to and from the blank as the carrier and knife are rocked transversely.

12. In a machine of the character described, the combination of a frame, head stocks for supporting a blank between them, means for rotating the blank, a knife carrier, means for rocking the knife carrier, and a roughing knife having its edge formed in a curve passing through the axis about which the knife carrier is rocked.

13. In a machine of the character described, the combination of a frame, head stocks for supporting a blank between them, means for rotating the blank, a knife carrier head, a knife carrier shaft mounted for rocking movement therein, means for rocking the knife carrier shaft in said head, a roughing knife having its edge formed in a curve passing through the axis of the carrier shaft, and means for moving the knife carrier head and knife carrier shaft in a direction transversely of the blank during the cutting action of the knife.

14. In a machine of the character described, the combination of a frame, head stocks for supporting a blank, means for rotating the blank, a slide stationary with respect to movement longitudinally of the blank, a knife carrier mounted on the slide to rock transversely thereof, a pattern to support the slide and knife carrier as the latter is rocked transversely, and a transversely curved knife mounted on the knife carrier.

15. In a machine of the character described, the combination of a frame, head stocks for supporting a blank, means for rotating the blank, a slide, a knife carrier mounted on the slide to rock transversely thereof, a pattern to support the slide and knife carrier as the latter is rocked transversely, a transversely curved knife mounted on the knife carrier, two cam means, and connections between them and the rocking knife carrier for actuating the latter.

16. In a machine of the character described, the combination of a frame, head stocks for supporting and rotating a blank, a swinging frame, a slide carried by the swinging frame, a roughing knife having a cutting edge curved longitudinally of the blank, means for rocking the roughing knife in a plane extending longitudinally of the blank, a pattern or form on the swinging frame to determine the bodily relation of the roughing knife and blank during the roughing action of the knife as it is rocked, and means for swinging the frame and slide away from the blank.

17. In a machine of the character described, the combination of a frame, head stocks for supporting and rotating a blank, a swinging frame, a slide carried by the swinging frame, a roughing knife having a cutting edge curved longitudinally of the blank, means for rocking the roughing knife in a plane extending longitudinally of the blank, a pattern or form on the swinging frame to determine the bodily relation of the roughing knife and blank during the roughing action of the knife as it is rocked, a finishing knife also carried by the slide, and means for swinging the frame and slide away from the blank.

18. In a machine of the character described, the combination of a frame, head stocks for supporting and rotating a blank, a swinging frame, a slide mounted on the swinging frame and carrying roughing and finishing knives, and means for rocking the roughing knife in a direction longitudinally of the blank to successively present different portions of the knife for action upon different longitudinal portions of the blank during the roughing action, said means effecting movement of the slide on the swinging frame to remove the roughing knife from operative positions and to place the finishing knife in operative position at the conclusion of the roughing operation.

19. In a machine of the character described the combination of a frame, head stocks for supporting and rotating a blank, a swinging frame, a slide mounted on the swinging frame and carrying roughing and finishing knives, means for rocking the roughing knife in a direction longitudinally of the blank to successively present different portions of the knife for action upon different longitudinal portions of the blank during the roughing action, said means effecting movement of the slide on the swinging frame to remove the roughing knife from operative position and to place the finishing knife in operative position at the conclusion of the roughing operation, and means for swinging the frame to carry both the roughing and finishing knives away from the blank after the action of the finishing knife.

20. In a machine of the character described, the combination of a frame, head stocks for supporting and rotating a blank, a slide, a roughing knife having a curved cutting edge and having rocking movement for presenting different portions of the roughing knife to the blank, a finishing knife mounted on the slide, and means for rocking the roughing knife during its cutting action and then moving the slide to carry the roughing knife out of and the finishing knife into operative position.

21. In a machine of the character described, the combination of a frame, means for supporting and rotating a blank, a slide, a finishing knife holder, means for adjustably holding the finishing knife holder on the slide, and adjustable devices secured to the finishing knife holder at separate points disposed about said means and adapted to bear against the face of the slide when the holder is in proper adjusted position that the holder may be removed and readily replaced in proper position on the slide.

22. In a machine of the character described, the combination of a roughing knife having a cutting edge curved longitudinally, a knife holder, a pattern upon which one of said parts bears, and means for rocking said part upon said pattern to vary the position of the knife during the cutting operation.

23. In a machine of the character described, the combination of a frame, means for supporting and rotating a blank, a knife holder 69 carrying a roughing knife 74 having a cutting edge curved longitudinally of the blank, a yoke 76 connected to the knife holder, arms 78 connected to the yoke and cams 83 for operating the arms 78 to impart a rocking movement to the knife.

24. In a machine of the character described, the combination of a frame, means for supporting and rotating a blank, a knife holder carrying a roughing knife 74 having a curved cutting edge, arms 78 and cams 83 for rocking the knife, and a pattern 84 for defining the movement of the knife as it is rocked.

25. In a machine of the character described, the combination of a slide frame 64 carrying a head 66, a knife carrier shaft 68 carried by said head, a roughing knife having a curved cutting edge connected to said shaft, arms 78 for rocking said shaft and lifting the slide frame, and a finishing knife 90 carried by said slide frame.

In testimony whereof, I have signed my name to this specification, in the presence of two subscribing witnesses.

WILLIAM C. FARNUM.

Witnesses:
ELLIOT S. EMERSON,
AMELIA M. ROSS.

---

Copies of this patent may be obtained for five cents each, by addressing the "Commissioner of Patents, Washington, D. C."